Feb. 18, 1947.  H. B. BABSON  2,416,139
MILKING TIMER SYSTEM
Filed Jan. 8, 1945  3 Sheets-Sheet 1
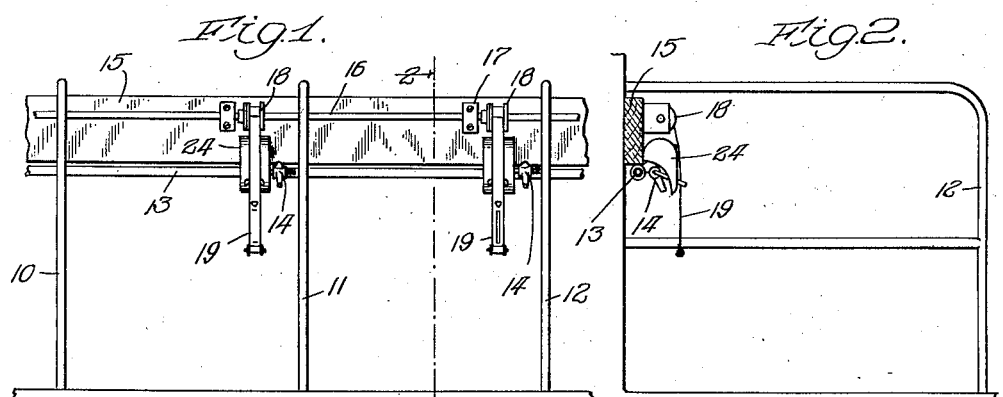
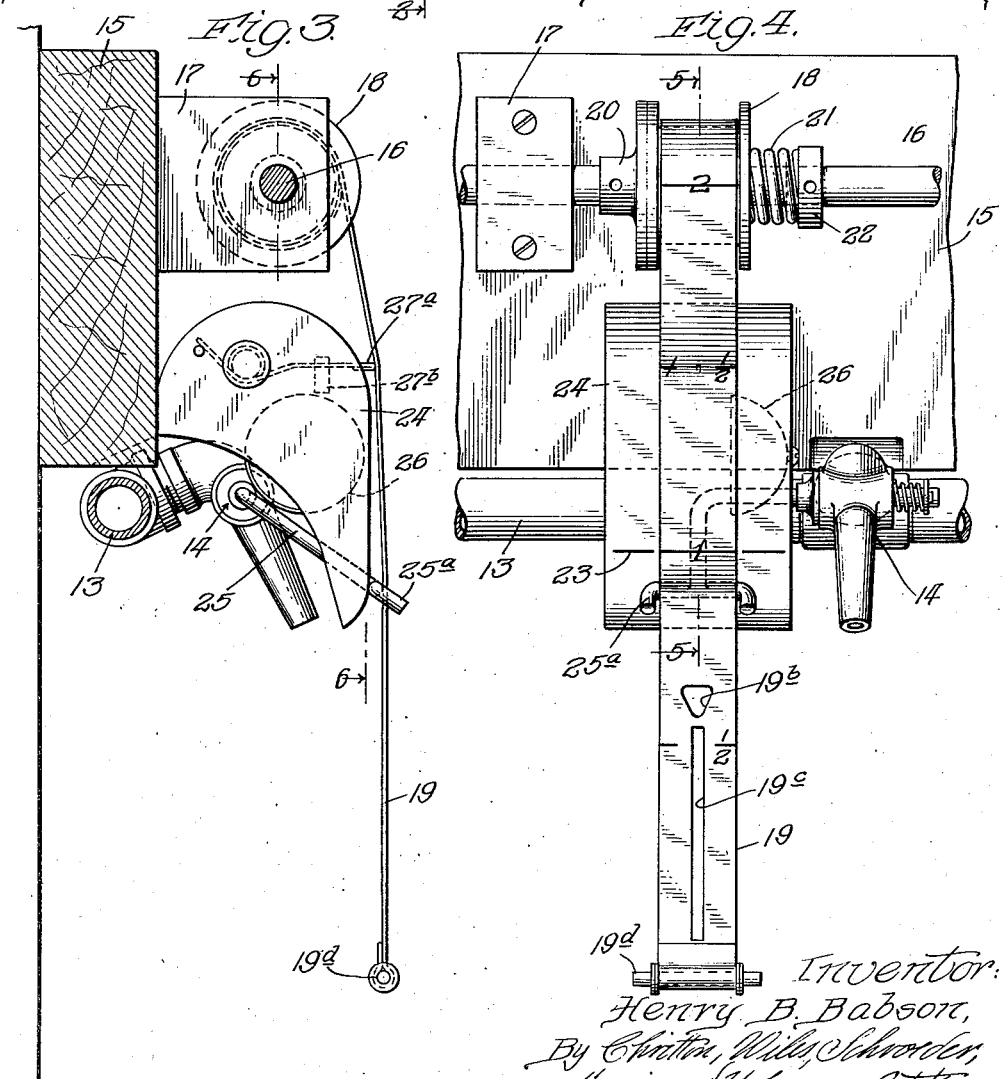
Inventor:
Henry B. Babson, Feb. 18, 1947. H. B. BABSON 2,416,139
MILKING TIMER SYSTEM
Filed Jan. 8, 1945 3 Sheets-Sheet 2
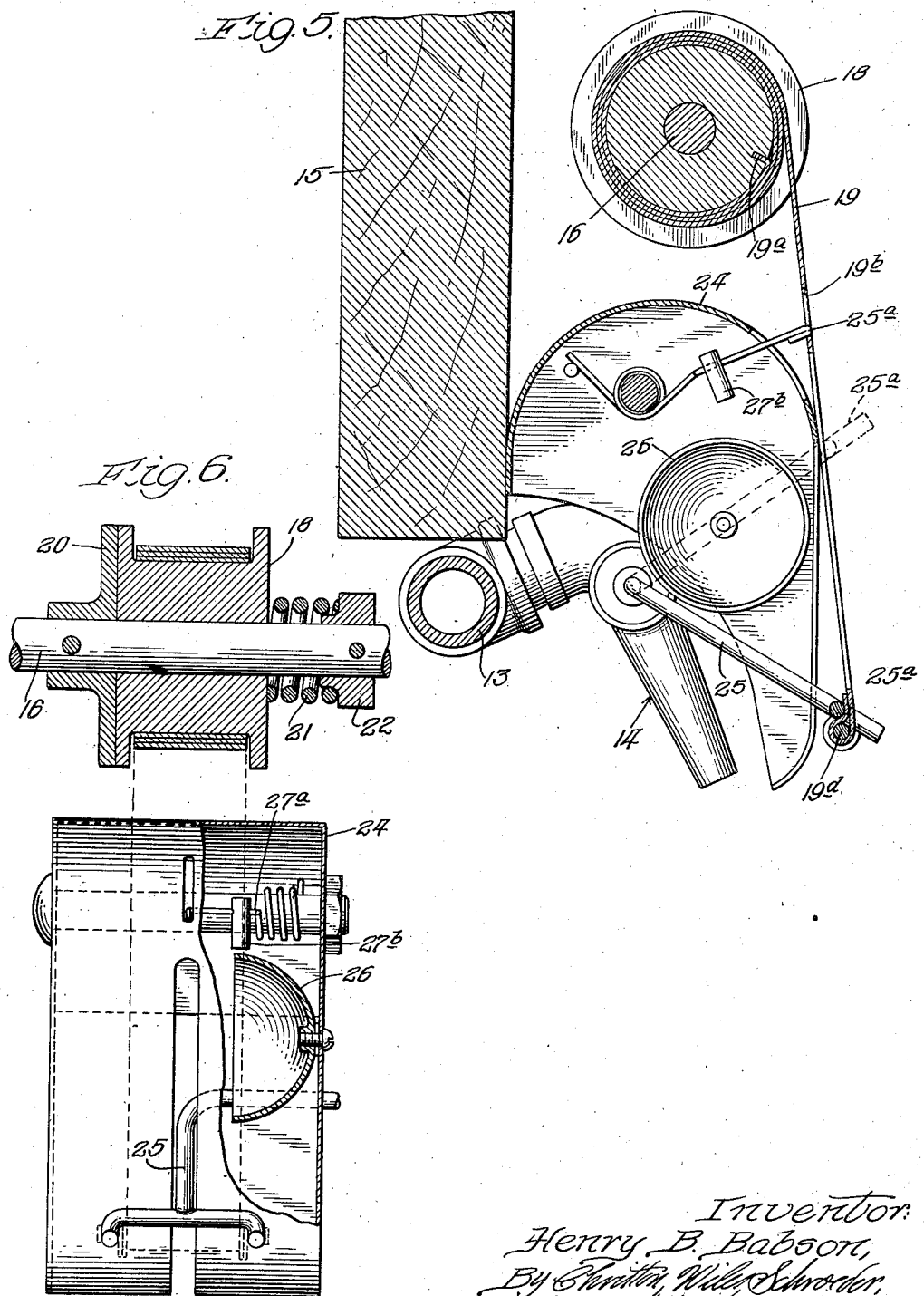
Inventor:
Henry B. Babson,
By Christen, Mills, Schroder,
Merriam, Hofgren, Attys.

Feb. 18, 1947.  H. B. BABSON  2,416,139
MILKING TIMER SYSTEM
Filed Jan. 8, 1945  3 Sheets-Sheet 3
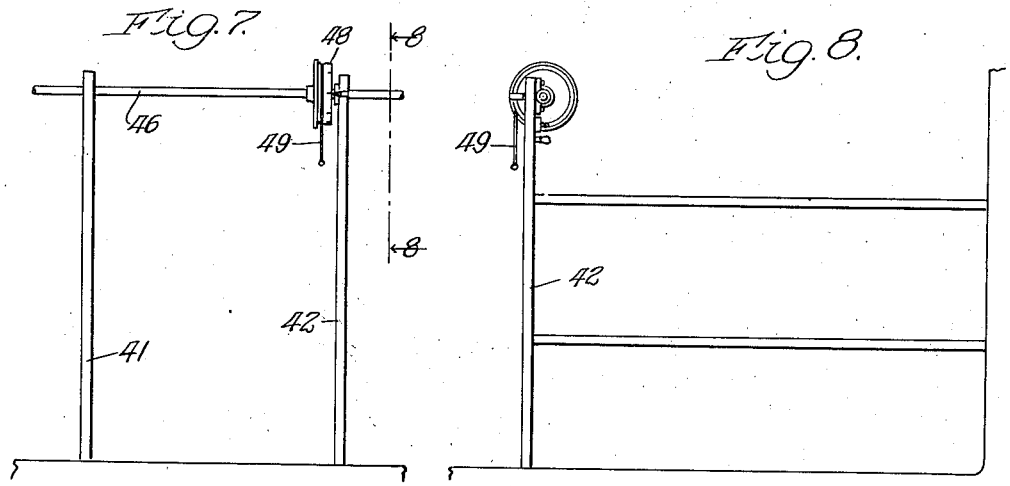
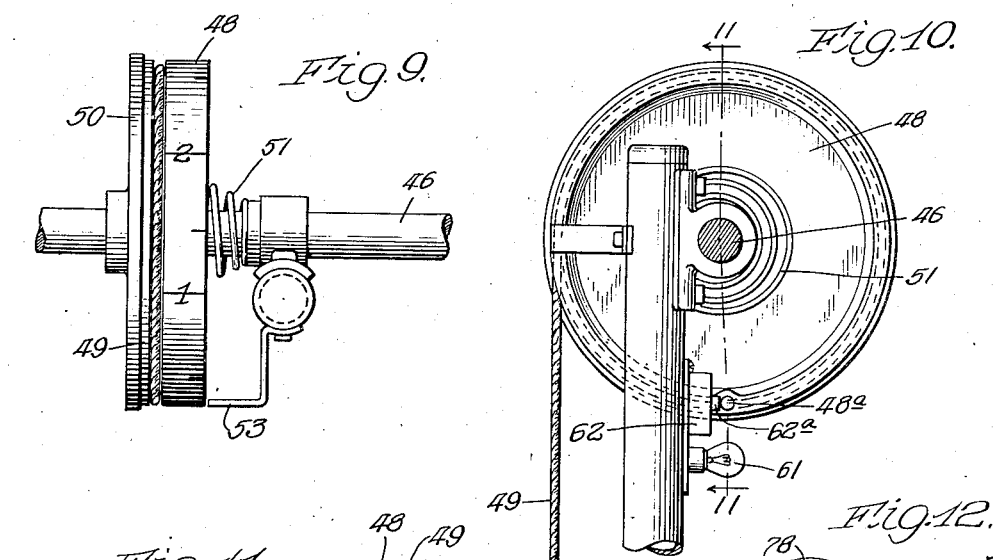
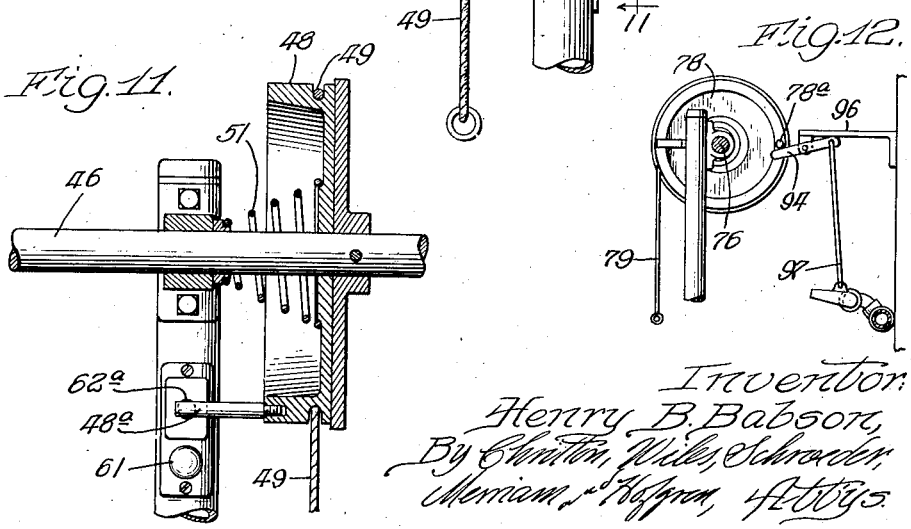
Inventor:
Henry B. Babson,
By Clinton, Wiles, Schroeder,
Merriam & Hofgren, Attys.

Patented Feb. 18, 1947

2,416,139

UNITED STATES PATENT OFFICE 2,416,139

MILKING TIMER SYSTEM

Henry B. Babson, Chicago, Ill., assignor to Babson Bros. Co., a corporation of Illinois Application January 8, 1945, Serial No. 571,821

7 Claims. (Cl. 161—7)

This invention relates to a milking timer system, and more particularly to a dairy installation wherein there is a row of stalls, as two or more stalls, and a milking timing arrangement operated by a single power source but capable of individual timing adjustment at each stall.

One feature of this invention is that it greatly improves the speed and convenience of milking a herd of cows; another feature is that it enables the cow to be milked in such manner as to impose the least strain on her, both physically and mentally; yet another feature is that the timing system is of a character particularly suitable for the conditions found in the average dairy barn, where there are particles of straw and dirt in the air, where the temperature may drop below freezing in the winter, etc.; still another feature of this invention is that the timing interval may be individually adjusted for the cow in a given stall very quickly and easily, merely by the length of pull exerted on a flexible element such as a strap or rope hanging in a convenient position, an act which does not require any fine adjustment and which can even be done conveniently with mittens on; a further feature of this invention is that the timing arrangement provides an indication of the termination of the desired milking period; yet a further feature of this invention is that the system is adapted automatically to shut off the vacuum to the milking machine at or about the time of giving of the indication; and still a further feature is that the timing system can be conveniently adjusted through a wide range, as from a minute and a half to five minutes milking period. Other features and advantages of this invention will be apparent from the following specification and the drawings, in which:

Figure 1 is a front elevational view of a portion of a row of stalls provided with a preferred embodiment of my invention; Figure 2 is a view, partly in section, along the line 2—2 of Figure 1; Figure 3 is an enlarged view of the timer system shown in Figure 2; Figure 4 is a front elevational view of the apparatus shown in Figure 3; Figure 5 is a view, partly in section, along the line 5—5 of Figure 4; Figure 6 is a view, partly in section, along the line 6—6 of Figure 3; Figure 7 is a front elevational view of a stall equipped with a milking timing system comprising another embodiment of my invention; Figure 8 is an end elevational view along the line 8—8 of Figure 7; Figure 9 is an enlarged top plan view of the timer shown in Figures 7 and 8; Figure 10 is an enlarged view of a timer as shown in Figure 8; Figure 11 is a vertical sectional view along the line 11—11 of Figure 10; and Figure 12 is a partial side elevational view of still another embodiment of my invention.

In dairies, particularly of the better grade, practically all milking is now done by milking machines; and in the interest of efficient utilization of a man's time during milking, one man generally handles from two to four milking machines. Under-milking of course, not only results in reduced milk output, but is also detrimental to the cow in that there is an undesirable residual carry-over in the udder. Over-milking, on the other hand, is also very undesirable. One of the factors in such regard is that floor-type milking machines, if left operating after the udder has been emptied "creep" up above the top of the teat, pulling part of the loose or slack udder down into the shell, with attendant pinching and actual physical injury. Moreover, the application of continued mechanical squeezing, and of vacuum, to the teat for a substantial period after that quarter of the udder is emptied can and sometimes does cause other physical harm. Moreover, good producing cows of the kind now found in better dairies have a highly developed nervous system, so that undesirable nervous reactions take place, detrimental to the milk output, if the cow is not milked in the most efficient and comfortable manner.

It has been found that the majority of the cows in a given herd, particularly where they are all of a given breed, can be trained to milk out in approximately a given range of time. Even there, however, there are cows which vary substantially from the average in the optimum milking time; and there are always cows which milk out very quickly, as newly freshened heifers, and cows which must be given a substantially longer time than the average, as very high producing cows or cows with udder or teat deformities, for example. It has been found that the mental and physical well-being of the cow and her milk output are greatly improved if she can be trained to milk out in the fastest time of which she is capable, which of course varies.

Some efforts have heretofore been made to provide milking timers, as for example that shown in Gengler Patent 2,351,675, which may be referred to for further discussion of the advantages of timed milking, if desired. The timer shown in that patent, however, and other timer efforts known to me, have never gone into commercial use because of their failure to recognize and solve certain problems incident to successful milking timing in a dairy barn or milking parlor.

One of the most serious difficulties in former timing efforts has been the lack of provision for individual timing of each cow. Another defect has been in failing to recognize the kind of temperature, humidity, and dust conditions, and the like, encountered in a barn. Still another defect in such former timing arrangements has been their inability to provide for proper timing where a single man handles two or three milkers, as is always the case in an efficient dairying operation. I have recognized these and other defects and objections to former milking timing systems, and have devised and am here disclosing and claiming apparatus which overcomes such objections and which provides for satisfactory milking timing.

Referring first to the specific embodiment of my invention illustrated in Figures 1-6, inclusive, two of a row of stalls in a dairy barn are illustrated, these stalls being defined by the partitions 10, 11 and 12 of pipe or other conventional construction. Extending along the back of the row of stalls, in conventional manner, is a vacuum pipe line 13 provided with a plurality of stall cocks, as the cock 14. While any conventional mounting arrangement may be used, the pipe line is here shown as supported from a wooden plank 15 in turn mounted upon the wall of the barn. Extending along the row of stalls above the pipe line 13, and also carried by the mounting member 15, is a rotatable shaft 16, this shaft being journalled at appropriate intervals in bearings here shown as comprising wooden bearing blocks, as the bearing arrangement 17. This shaft is rotated in a carefully controlled timed rate, as for example one revolution per minute (by a conventional synchronous motor driving the shaft through reduction gears, this arrangement not being shown) and this shaft provides the source of power for controlling and operating the timing arrangements individually associated with each stall. Inasmuch as the arrangement in connection with each stall duplicates that in connection with other stalls, only one such arrangement will be described in detail, reference being now had more particularly to Figures 3-6, inclusive.

Rotatably mounted on the shaft 16 is a rotatable member or pulley drum 18 having one end 19a of a flexible element or strap 19 rigidly fastened thereon so that rotation of the member 18 is adapted to wrap the strap thereon. One side of the pulley member 18 (the left-hand side as viewed in Figures 4 and 6) provides one element of a friction clutch drive arrangement, the other element being the disk member 20 rigidly mounted on and rotatable with the shaft 16. A spring 21 lying between the other side of the pulley member and a collar 22 rigidly attached to the shaft 16 urges the pulley member toward the disk member 20 to provide the desired frictional driving engagement. This frictional engagement should be sufficient to pull up the strap and operate the indicating and shut-off arrangements to be subsequently described, but not so great as to prevent convenient slipping of the clutch connection by merely reaching up and pulling down on the strap 19. When a given timing arrangement is inoperative the strap would be completely wrapped around the drum portion of the pulley member 18 and the pulley member and strap would turn idly in synchronism with the rotation of the shaft 16. When it is desired to initiate operation of the timing arrangement the free end of the strap is grasped and pulled down with sufficient force to rotate the pulley member 18 backwardly (slipping the clutch arrangement) until the lower end of the strap has been pulled down to a distance determining the desired time interval. Referring more particularly to Figure 4 it will be seen that the strap is marked with graduations indicating ½ minute, 1 minute, 1½ minutes, 2 minutes, etc.; and these graduations are adapted to cooperate with an indicating graduation 23 on a housing or cover member 24. It will be understood, of course, that the strap would be of sufficient length to be wrapped around the drum portion of the pulley member 18 five or six times in fully wrapped up condition, where time periods up to five minutes are to be provided in connection with a power shaft rotating at one revolution per minute.

The stall cock 14 has a rotatable control valve arrangement of conventional type, this being here shown as adapted to be actuated by an actuating arm or member 25 having a forked end portion 25a. When this actuating arm is in the position shown in solid lines in Figure 5 the valve is in the open position and vacuum is applied to a milker hose which might be slipped over the connector nipple end of the stall cock. On the other hand, when the actuating arm is moved to the position shown in dotted lines, as shown in Figure 5, the valve is closed and there is no communication between the milker hose and the vacuum line 13. Within the housing 24 is a gong 26 and an associated spring mounted striker arrangement comprising a spring arm 27a and a clapper or striker portion 27b. The housing 24 is appropriately slotted, as may be best seen in Figures 5 and 6, to permit movement of the projecting portions of the arms 25 and 27a.

In milking in a dairy installation including timing arrangements of the kind described, the dairy man would place the milker in operative relation to the cow, slip the vacuum hose on the connector end of the stall cock, pull the strap down to the desired time interval (as indicated by the graduation 23 and a cooperating graduation on the strap), and then move the valve actuating arm 25 from the dotted line position as shown in Figure 5 to the solid line position as shown there. If a 2½ minute milking period had been found best for the particular cow then being milked, it will be understood that the strap would have been pulled down until the 2½ minute graduation had been opposite the graduation 23. The parts are shown in Figures 3 and 4 in the position in which they would be when there was one minute of milking period yet to go; and they are shown in Figures 5 and 6 in the position where they would be when the milking period is about to be terminated. It will be noted that the strap 19 is provided with an opening 19b, a fairly long slot 19c therebelow, and a cross rod 19d at the bottom end thereof. As the strap continues to move up it rubs along the outwardly projecting end of the spring arm 27a (as may be best seen in Figure 5) until the opening 19b is reached, whereupon the end of the arm 25a drops into this opening and the arm is moved upwardly (against its spring tension) to the position shown in Figure 5 by slight further movement of the strap. When the position shown in Figure 5 is reached the cross rod 19d has just engaged under the ends of the forked portion 25a, and the strap is about to move the valve actuating arm 25. Slight further upward movement of the strap from the position shown in Figure 5 causes the striker arm 25a to slip out of the opening 19b and (because of freedom of movement permitted by the slot 19c) drop down rapidly to cause the striker element 27b to hit the top of the gong 26 and give an audible indication that the desired predetermined milking period is over. If the man is immediately there and the indication thus provided calls his attention to that stall, he immediately reaches in and manually moves the valve shut-off arm 25 to its upper or closed position. If he is not conveniently at hand but is elsewhere in the barn, continued upward movement of the strap 19 automatically shuts off the vacuum to the milker within a very short period after the audible indication has been given, as a quarter of a minute, it being understood that valve shut-off actually takes place considerably before the arm 25 reaches its uppermost position. While I can arrange matters so that the automatic shut-off and audible indication take place almost simultaneously, I prefer to have the automatic shut-off action take place very slightly after the audible indication is given, but not more than one minute thereafter, and have illustrated my device as arranged in that manner. Where a suspended milker of the kind shown in McCornack Patent 1,859,213 is used, or where the claw of a claw-type milker has been heavily weighted, loss of vacuum in the milker through seepage between the teats and inflations, and the like, will even reduce the vacuum sufficiently in a short period to let the inflations and shells drop off the teats if the cow has not received attention within a reasonable period after the indication is given. The result is a timing arrangement of a kind which is practical and usable in a dairy barn, which is individually adjustable for each cow through practically any desired range, and which automatically provides for relieving the cow if the operator does not give proper attention when the milking terminating indication is heard. The phrase "milking terminating means" as used in this application refers to a means or mechanism of procuring, either directly or indirectly, the cessation of milking after the expiration of the desired milking time.

Where the protective automatic operation provided by the previously described embodiment of my invention is not desired, a somewhat simplified apparatus comprising another embodiment of my invention may be used, this embodiment being illustrated in Figures 7–11, to which reference will now be had. In order to simplify and shorten the description of this embodiment of my invention, reference numerals will be applied to corresponding parts such that the reference numerals are 30 higher than those used in describing corresponding parts in the embodiment illustrated in Figures 1–6, so that it will be understood that the more full description given in the earlier portion of the specification may be reviewed to supplement the briefer description of the embodiment illustrated in Figures 7–11.

The power source for all the timing arrangements, the rotatable shaft 46, in this case extends along and is carried by the front posts of the row of stalls, as those providing part of the partitions 41 and 42. Rotatably mounted on the shaft 46 is a pulley member 48 of fairly large diameter, as 6 inches or more, this rotatable member 48 being adapted to be driven through a slip clutch driving arrangement provided by its association with the disk member 50 rigidly mounted on the shaft 46, the desired frictional pressure being provided by the spring 51. The pulley member is provided near one edge with a groove adapted to have a flexible element 49, here shown as a rope, wrapped therein. In this arrangement I prefer to rotate the shaft at a much slower rate, as once in each five minutes, and to provide the full range of desired adjustment by a single rotation of the member 18. In this case the graduations for one minute, two minutes, three minutes, etc. are marked directly on a drum surface of the rotatable member 48 and cooperate with an indicating arm or pointer 53 fixedly carried by one of the partition posts, as may be best seen in Figure 9.

In this particular embodiment of my invention the desired indication is provided visually by changing the condition of illumination of a lamp 61 through movement of contacts in a switch unit 62 having a movable button portion 62a. Projecting from the rotatable member 48 at one portion thereof is a stop rod 48a adapted to engage the button 62a at the conclusion of movement of the rotatable member. Referring more particularly to Figure 10, pulling down on the rope 49 will rotate the pulley member 48 counterclockwise (slipping the clutch) to the desired position predetermining the timing interval. Thereafter the pulley member 48 will be rotated clockwise by the action of the drive shaft 46 until it reaches the position shown in Figure 10, where the engagement of the stop rod 48a with the button 62a will effect change of illumination of the lamp 61 and stopping of the rotatable member 48, the clutch thereafter slipping. I prefer to have the circuit connections to the lamp so arranged that the lamp 61 will be illuminated when the button 62a is pushed inwardly in the switch unit, so that lighting of the lamp indicates termination of the milking period; but it will be understood that the opposite change of illumination may be used equally well. The embodiment of my invention just described provides no automatic follow-up action if the indication does not secure the attention of the operator, but is somewhat simpler in construction and, since it can be mounted at the front end of each stall, more convenient to operate.

I also contemplate an arrangement which provides an automatic shut-off by the use of a timing arrangement generally similar to that just described above, either with or without associated indicating means, a specific embodiment of my invention in this regard, without indicating means, being illustrated in Figure 12. In describing this embodiment reference numerals 60 higher than those used in connection with the embodiment first described heretofore will be applied to corresponding parts.

In this embodiment of my invention a rotatable member or pulley member 78 carries a rope or other flexible element 79 and is rotatably mounted upon a timing and power shaft 76, which may rotate once in five minutes. As in the arrangement illustrated in Figures 7–11, a slip clutch drive connection is provided between the shaft 76 and the rotatable member 78; and a stop rod 78a effects the desired operation at the conclusion of the predetermined milking interval or period. In this embodiment of my invention a rocker arm 94 is centrally pivoted and supported in any desired manner, as by a bracket 96 extending out from the wall. At the conclusion of the predetermined milking interval the stop rod 78a strikes the left-hand end of the rocker arm 94 and moves the right-hand end up, this end being connected through a pull rod 97 to a connector nipple or movable portion of a stall cock of the kind more fully disclosed and claimed in my copending application Serial No. 555,873, although it will be understood that the pull rod may be connected to the actuating member or handle of a more conventional stall cock, as for example a cock of the kind illustrated in Figures 1-6. In any event, the last half inch or so of travel of the stop rod 78a operates through the rocker arm and pull rod automatically to shut off the vacuum connection to the milker and thus terminate the milking period.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a dairy installation wherein there is a row of stalls, a milking timing arrangement including: power source means comprising a rotatable shaft extending along said row of stalls; means for rotating said power means shaft at an accurately controlled rate; rotatable means associated with each stall; a friction clutch connection between the power means shaft and each rotatable means; indicating means associated with each rotatable means; means for manually rotating each rotatable means in a direction opposite to that in which it is urged by the friction clutch connection until the amount of rotation is such that a desired time interval is indicated by the indicating means; and normally inoperative indicating means operatively associated with each rotatable means to be actuated thereby to provide an indication at the end of a predetermined milking period.

2. In a dairy installation wherein there is a row of stalls, a milking timing arrangement including: power source means comprising a rotatable shaft extending along said row of stalls; means for rotating said power means shaft at an accurately controlled rate; rotatable means associated with each stall; a friction clutch connection between the power means shaft and each rotatable means; normally inoperative indicating means associated with each rotatable means; means for manually rotating each rotatable means in a direction opposite to that in which it is urged by the friction clutch connection until the amount of rotation is such that a desired time interval is indicated by the indicating means; and power shut-off means operatively associated with each rotatable means to be actuated thereby at the end of a predetermined milking period.

3. In a milking installation wherein there is a source of vacuum power adapted to have a milker connected thereto, a milking timing arrangement including: valve means for controlling the vacuum connection to the milker; timing means including rotatable means adapted to be rotated at a predetermined rate, the rotatable means being operatively associated with the valve means for moving it to closed position at a desired time interval after milking has been initiated; and normally inoperative indicating means operatively associated with the timing means to be actuated thereby within one minute of the end of the desired time interval.

4. In a milking installation wherein there is a source of vacuum power adapted to have a milker connected thereto, a milking timing arrangement including: valve means for controlling the vacuum connection to the milker; timing means including rotatable means adapted to be rotated at a predetermined rate and a flexible element moved thereby, the flexible element being operatively associated with the valve means for moving it to closed position at a desired time interval after milking has been initiated; and indicating means operatively associated with the flexible element to be actuated thereby within one minute of the end of the desired time interval.

5. In a milking installation wherein there is a source of vacuum power adapted to have a milker connected thereto, a milking timing arrangement including: valve means for controlling the vacuum connection to the milker; timing means including rotatable means adapted to be rotated at a predetermined rate, a friction clutch drive for said rotatable means, and a flexible element adapted to be wrapped around the rotatable means and moved thereby, the flexible element being operatively associated with the valve means for moving it to closed position at a desired time interval after milking has been initiated; and indicating means operatively associated with the flexible element to be actuated thereby within one minute of the end of the desired time interval.

6. In a milking installation wherein there is a source of vacuum power adapted to have a milker connected thereto, a milking timing arrangement including: valve means for controlling the vacuum connection to the milker; timing means including rotatable means adapted to be rotated at a predetermined rate and a flexible element moved thereby, the flexible element being operatively associated with the valve means for moving it to closed position at a desired time interval after milking has been initiated; and indicating means operatively associated with the flexible element to be actuated thereby, this element having a slot therein adapted to receive a portion of the indicating means.

7. In a milking installation wherein there is a source of vacuum power adapted to have a milker connected thereto, a milking timing arrangement including: power shut-off means for controlling the vacuum power supply to the milker; timing means including rotatable means adapted to be rotated at a predetermined rate, a friction clutch drive for said rotatable means, and a flexible element adapted to be wrapped around the rotatable means and moved thereby, the flexible element being operatively associated with the shut-off means for shutting off the power supply to the milker at a desired time interval after milking has been initiated; and normally inoperative indicating means operatively associated with the flexible element to be actuated thereby within a predetermined brief period of the end of the desired time interval.

HENRY B. BABSON.

REFERENCES CITED

The following references are of record in the file of this patent:

UNITED STATES PATENTS

| Number | Name | Date |
|---|---|---|
| 2,067,266 | Gikow | Jan. 12, 1937 |
| 2,253,752 | Bemis | Aug. 26, 1941 |
| 2,257,291 | Bemis | Sept. 30, 1941 |
| 2,351,675 | Gengler | June 20, 1944 |
| 2,204,532 | Erbguth et al. | June 11, 1940 |
| 2,360,321 | Griswold | Oct. 17, 1944 |
| 1,652,845 | Vennum | Dec. 13, 1927 |